F. L. ARMSTRONG.
TESTING MACHINE.
APPLICATION FILED SEPT. 5, 1911.
1,052,302.
Patented Feb. 4, 1913.
2 SHEETS—SHEET 1.
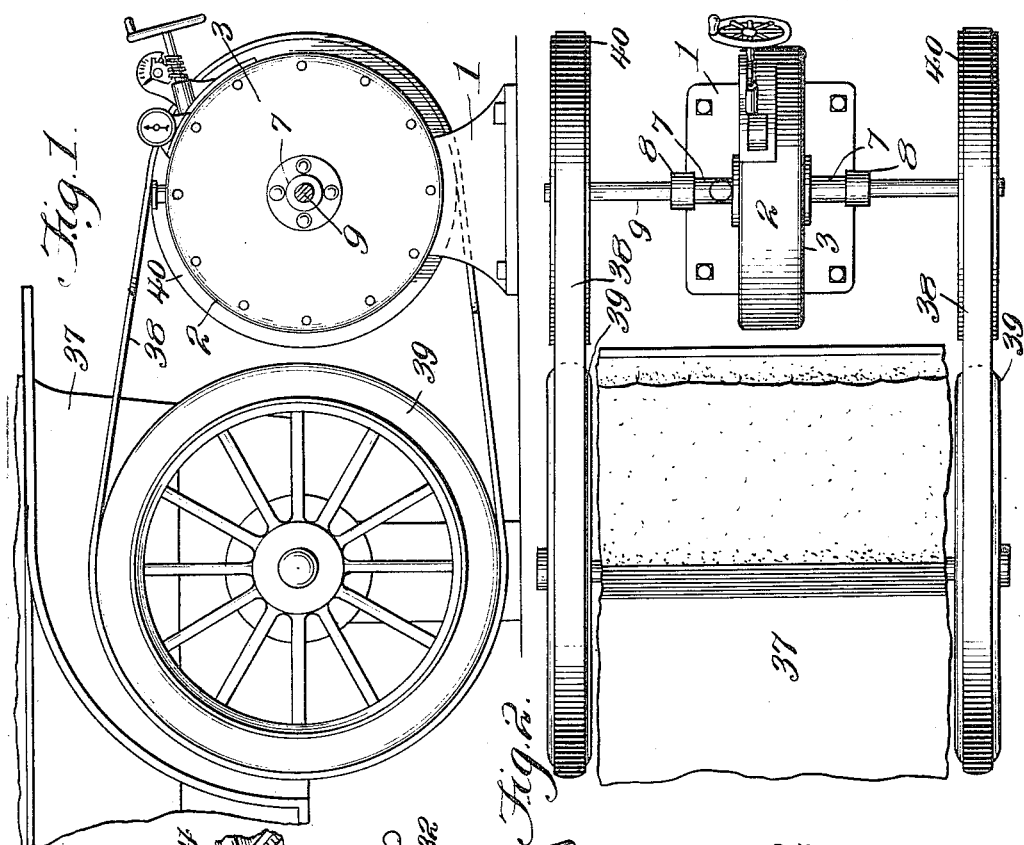
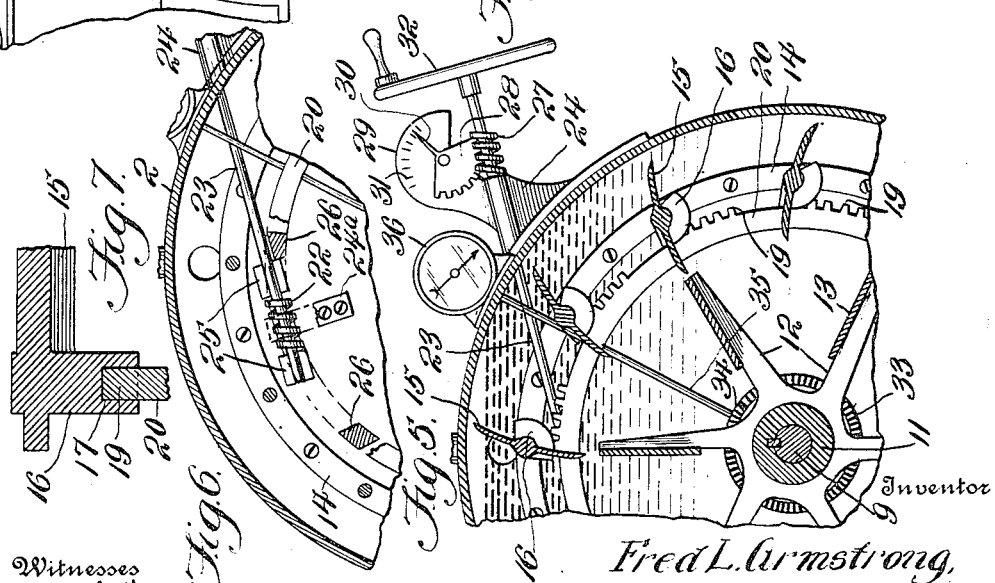

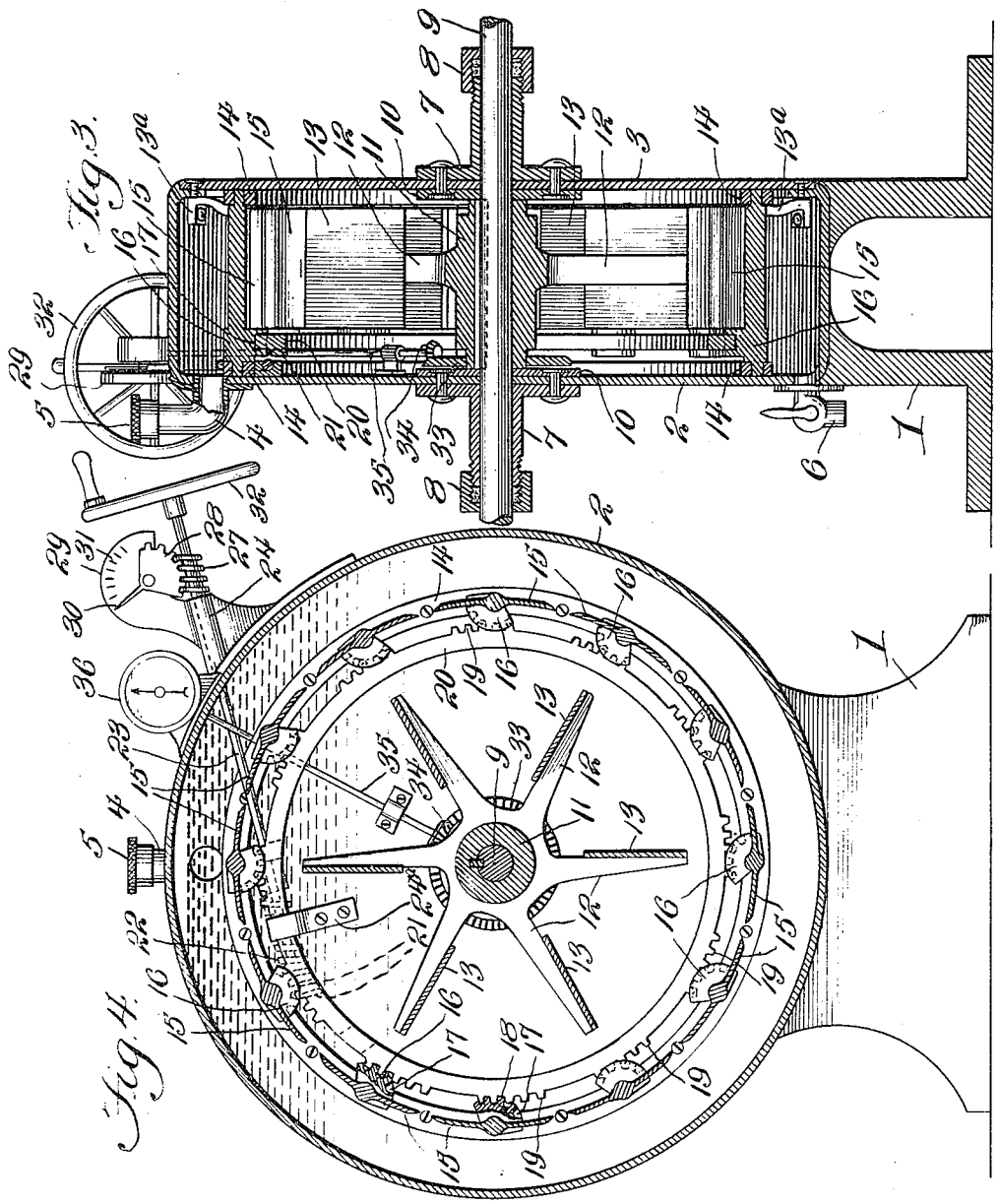

UNITED STATES PATENT OFFICE.

FRED L. ARMSTRONG, OF CHERRY VALLEY, NEW YORK.

TESTING-MACHINE.

1,052,302.

Specification of Letters Patent.

Patented Feb. 4, 1913.

Application filed September 5, 1911. Serial No. 647,500.

*To all whom it may concern:*

Be it known that I, FRED L. ARMSTRONG, a citizen of the United States, residing at Cherry Valley, in the county of Otsego and State of New York, have invented new and useful Improvements in Testing-Machines, of which the following is a specification.

This invention relates to testing machines and more particularly to that type which are adapted to determine the horse power of engines, such as automobile engines or the like.

While the device is particularly adapted to test the horse power of automobiles, it is equally adapted to test the horse power of stationary engines of any character.

One of the principal objects of this invention is to provide a simple, cheaply constructed device of this character wherein the resistance offered to the speed of the engine may be properly regulated and the exact horse power of the engine determined under favorable conditions.

The horse power of an automobile engine can be easily enough determined before installing the engine into the machine by the ordinary belt test or in any other suitable manner. The efficiency of the engine of the automobile, however, is now tested only by taking the machine out on the road and running the machine up a hill where the efficiency of the machine is guessed at. No standard can be determined by such a trial because the conditions under which the trials are made are never perfect. Wind, heat, and other elements, such as the conditions of the roads and so forth, make the test a failure so far as accuracy goes.

It is the object of this invention to avoid these difficulties and to provide a machine whereby the efficiency of an automobile may be conveniently tested under favorable circumstances. The engine can be properly turned and its parts correctly adjusted without the inconveniences encountered with such operations when made on the road.

Further objects of the invention will appear as the following specific description is read in connection with the accompanying drawing, which forms a part of this application, and in which:—

Figure 1 is a side elevation of the machine shown connected to the rear wheels of an automobile. Fig. 2 is a top plan view thereof with parts of the automobile broken away. Fig. 3 is a vertical sectional view taken through the machine. Fig. 4 is a similar section taken at right angles to Fig. 3. Fig. 5 is a similar section with the resistance wings or blades turned to their maximum position. Fig. 6 is a detail sectional view showing the connection of the adjusting shaft with the shifting ring. Fig. 7 is a detail sectional view through one of the resistance wings or blades and its associated gear segment.

Referring more particularly to the drawings, 1 represents a standard or base which may be bolted or otherwise secured to the floor or other suitable support and which carries a casing or tank 2 having one of its sides 3 removably secured so as to readily permit the assembling of the parts or to permit inspection of the mechanism therein for the purpose of repairing or replacement of parts as may be found necessary. The casing is provided with an inlet tube 4 preferably closed with a screw cap 5 and with a valve outlet 6 so that the casing may be freed of its contents when desired. The side plates of the casing carry suitable bearing members 7 which are provided with packing glands 8 and are preferably bushed to receive the shaft 9 which is centrally journaled in the casing and has secured thereto, intermediate the thrust bearing plates 10, a hub 11 which is provided with a plurality of radiating spokes or arms 12 on to which are formed the blades 13. Preferably, the hub spokes and blades are cast as a unit but it will be understood that this structure may be built up as separate parts, if found expedient.

Secured to the inner face of the side of the casing, and to brackets 13$^a$ are annular rings 14 which are provided at intervals with trunnion openings in which the trunnions of suitable resistance blades 15 are mounted. These blades are separated sufficiently so that when in their normal or inactive position, they will all lie in a position concentric with the shaft 9, and when tilted, or turned upon their trunnions, will lie at intermediate points between the concentric position and a radial position, as will be hereinafter described. Each one of the wings, or blades 15 has secured thereto, a segmental member 16 which is provided with a peripheral notch or channel 17, in the base of which is formed gear teeth 18 adapted to be engaged by similar teeth 19 formed on an annular shifting member 20, whose periphery lies in the channel 17, and is thereby prevented from lateral movement. This annular shifting member is provided upon one side with a plurality of gear teeth 21 which are engaged by a worm 22 upon the shaft 23 which extends diagonally into the casing through a packing gland 24. The inner end of this shaft is held in bearings 25, which are arranged on opposite sides of the worm and are adapted to form limiting stops against which the lugs 22 abut when the member 20 is in either of its extreme positions. A bracket 24ª is secured to the casing and engages the shifting member 20 so as to prevent its disengagement with the worm 22. Immediately beyond the gland 24, the shaft 25 is provided with a worm 27 which meshes with a segment 28 forming a part of an indicator 29, whose indicating hand 30 moves over a graduated dial 31 to indicate the degree of inclination of the resistance wings. The outer end of the shaft 23 is provided with a hand wheel 32 by which the shaft is rotated and the shifting member 20 moved to turn the wings upon their trunnions.

Connected to the hub 11, is a beveled gear 33, and in mesh with this gear, is a beveled pinion 34 carried upon the end of a shaft 35 which extends out of the casing or tank 2 and is connected to a suitable speedometer 36 mounted on a casing.

In the operation of the device, an automobile, such as is shown at 37, is backed up to the machine and jacked up off the ground and belts 38 placed over the rear wheels 39 of the machine and over pulleys 40, secured to opposite ends of the shaft 9, and which are preferably of such construction as to act as fly wheels so as to resemble the momentum of the car. The automobile engine is started up in the usual manner and the machine operated, as will be readily understood. If the engine is capable of rotating the hub and its associated blades, which will hereinafter be termed the fluid displacer, at a speed of two hundred revolutions per minute, we will say, and with the wings in a normal or inactive position, the horse power of the engine will be determined at, say ten, while, if the fluid displacer is rotated at the same speed with the blades at an inclination of a five degree angle to their normal position, the horse power of the engine will be rated at 15, while a greater increase in the angle of the wings from their normal position at the same number of revolutions will indicate a correspondingly increased horse power, which can be very readily determined. The casing is preferably filled with some non-corrosive fluid, such as lubricating oil or the like which is caused to rotate with the fluid displacing member, and is interrupted in its travel by the resistance wings, as will be readily understood. The greater the area of the interruption presented to the fluid, the greater the resistance offered to its travel and, therefore, greater resistance offered to the rotation of the fluid displacing member.

Having thus fully described the invention, what I claim as new, is:—

1. In a testing machine, a casing, a fluid arranged therein, a shaft journaled in said casing, annular means secured within said casing and provided with trunnion openings, resistance members mounted within said trunnion openings, means to adjust said resistance members, and means to determine the relative relation of the resistance members and the fluid displacing members.

2. A testing machine comprising a casing, a fluid arranged therein, a rotating fan-like fluid displacer mounted in the casing, annular rings secured to the inner faces of the sides of the casing and provided with trunnion openings, a plurality of rotatably mounted blades arranged within said trunnion openings, adjusting means therefor, a gear connection between the adjusting means and all of the blades, means actuated by the adjusting means for determining the amount of adjustment of the blades and their angular position with relation to the rotating fluid displacer, a speedometer, and a connection between the said speedometer and the fluid displacer.

3. In a testing machine a support, a casing mounted on the support, a shaft journaled in the casing, a hub secured on said shaft, fluid displacing members carried by said hub, annular rings secured to the inner side faces of the casing and provided with trunnion openings, blades arranged in said openings and provided with notched segments, an annular toothed shifting member mounted within said casing and adapted to engage with the notched segments of said blades, means for operating said shifting members and means for operating the fluid displacing members.

In testimony whereof I affix my signature in presence of two witnesses.

FRED L. ARMSTRONG.

Witnesses:
E. EDMONSTON, Jr.,
M. FROTHINGHAM.